Oct. 12, 1943.  W. R. TUTTLE ET AL  2,331,361
DISPLAY CONTAINER
Filed July 17, 1940   2 Sheets-Sheet 1
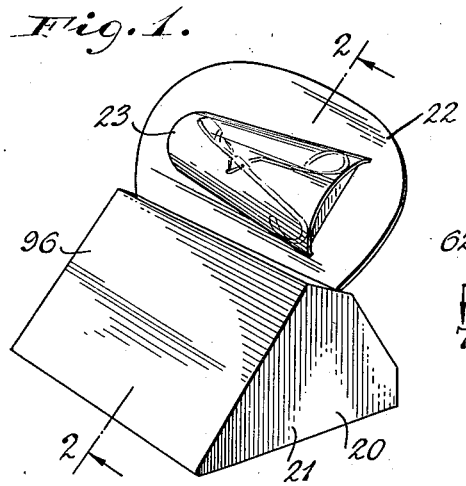
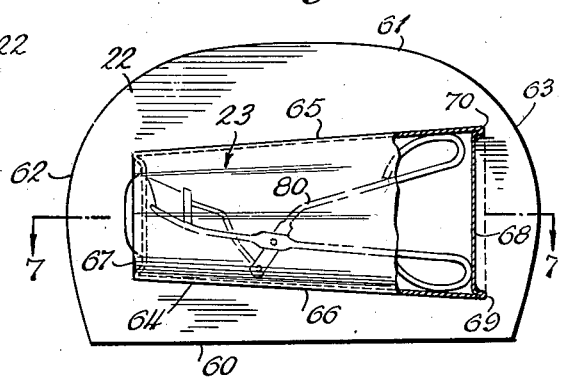
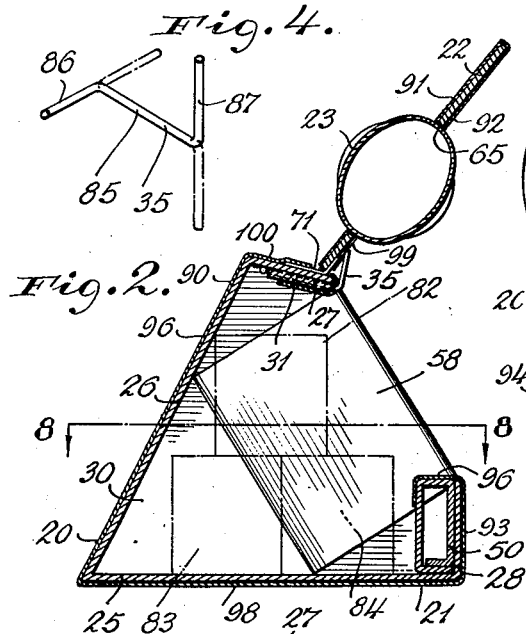
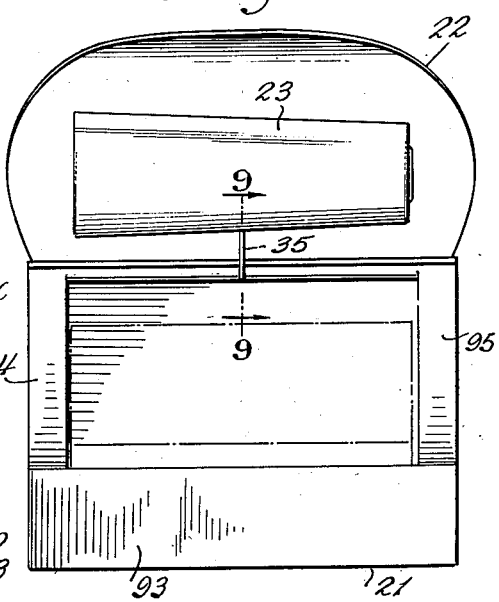
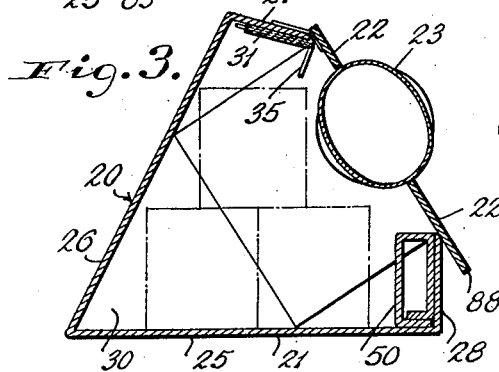
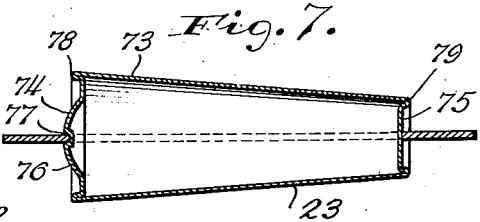
INVENTORS
WILLIAM R. TUTTLE
CHARLES W. STICKEL
BY
ATTORNEY

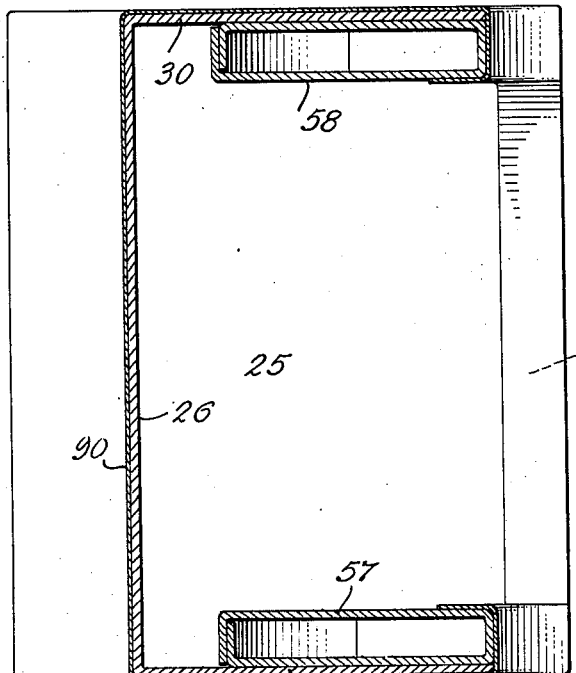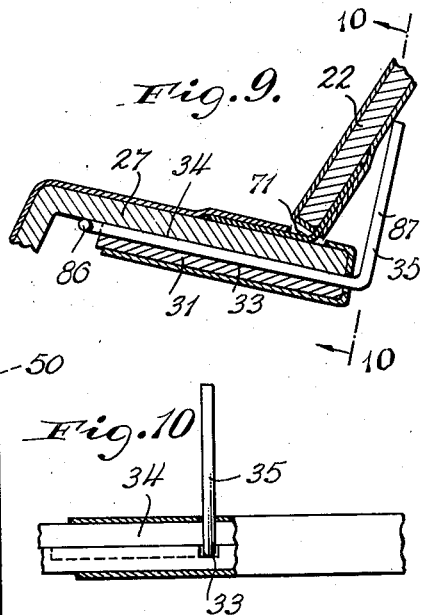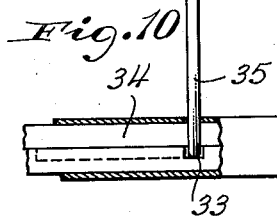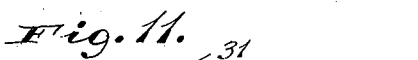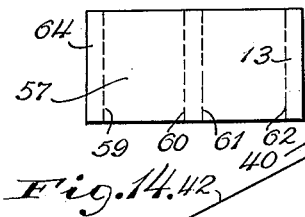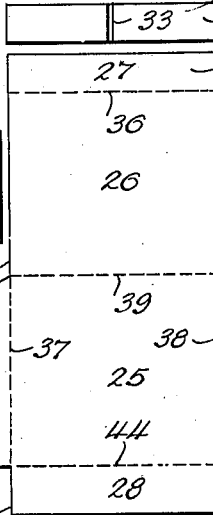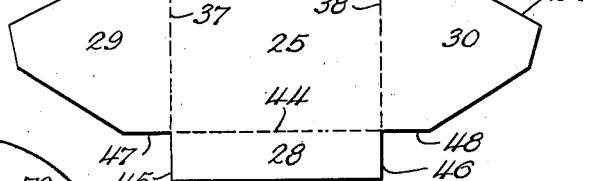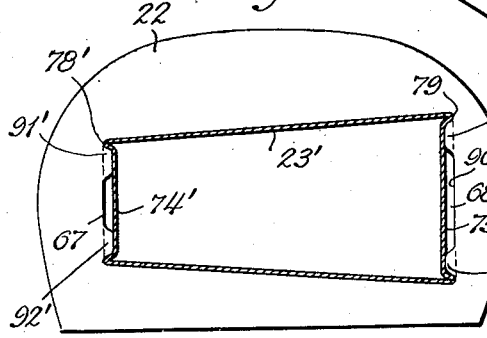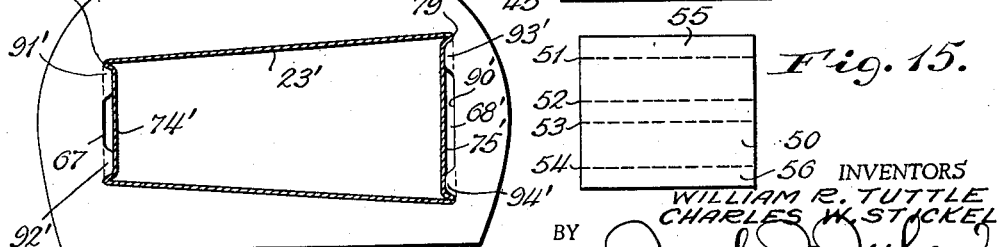

Patented Oct. 12, 1943

2,331,361

UNITED STATES PATENT OFFICE 2,331,361

DISPLAY CONTAINER

William R. Tuttle and Charles W. Stickel, Rochester, N. Y., assignors to The Kurlash Company, Inc., Rochester, N. Y., a corporation of New York Application July 17, 1940, Serial No. 345,942

5 Claims. (Cl. 206—44)

This invention relates generally to receptacles and more particularly to display containers, especially adapted for the transportation, storage, and display and sale of certain articles of manufacture.

Among the objects herein, is the provision of a display container having a movable cover or top which is adapted to serve the double function of acting as a closure for the mouth or entrance of the box in one position, and in another position, to act as a display panel, disposed at an angle with relation to the horizontal and which will thereby show a sample of the contents of the box in a pleasing and otherwise desirable manner.

Another object herein lies in the provision of novel display box constructions in which the article on display is protected from dirt and moisture so that not only is it shown to the purchasing public in a desirable manner but after all of the contents of the box have been sold, the item on display may be removed from the box or container and also sold.

Another object herein lies in the provision of a display container in which the item on display is individually packaged and such package forms part of the principal closure and display member.

A still further object of the present invention lies in the provision of a display container having means therein for guiding products stored therein so that said products may be easily removed or replaced.

Another object herein lies in the provision of an orificed cover member and a transparent subcontainer detachably engaged therein whereby a sample of the products in the main container may be displayed and also the customer may see the contents of the main container through the auxiliary container when the cover member is in the closed position thereof.

Another object herein lies in the provision of novel display box constructions having the aforementioned qualities, yet which are of simple organization having a minimum of moving parts so that fool-proof operation results.

Another object herein lies in the provision of a novel display box construction in which only a small amount of additional material and labor is required so that the present display box may be manufactured with relatively slight increase in cost over the cost of similarly constructed boxes which do not have applicants' display feature.

Another object herein lies in the provision of novel box construction which may find use in a relatively large number of different styles of boxes with equal usefulness.

These objects and other incidental ends and advantages will more fully appear in the progress of this disclosure and be pointed out in the appendant claims.

In the drawings forming a material part herein similar reference characters designate corresponding parts throughout the several views.

Figure 1 is a view in perspective showing a first embodiment of the invention with the cover in an elevated or open position.

Figure 2 is a central vertical sectional view slightly enlarged as seen from the plane 2—2 on Figure 1.

Figure 3 is a sectional view taken similarly to Figure 2 showing the cover in the lowered or closed position thereof.

Figure 4 is an enlarged view in perspective showing in detail the control member.

Figure 5 is an enlarged elevational view partly in section of the cover member.

Figure 6 is a rear elevational view of Figure 1 at the same scale as Figure 2.

Figure 7 is a horizontal sectional view as seen from the plane 7—7 on Figure 5.

Figure 8 is an enlarged horizontal sectional view as seen from the plane 8—8 of Figure 2.

Figure 9 is a fragmentary enlarged vertical sectional view showing in detail the control member and adjacent parts as the same appear with the cover in an open position thereof, as seen from the plane 9—9 on Figure 6.

Figure 10 is a rear elevational view partly in section of Figure 9 with the cover removed, as seen from the plane 10—10 thereon.

Figure 11 is a top plan view of the control member support plate.

Figures 12 and 13 are plan views of the blank from which are formed the side reenforcing and spacing members.

Figure 14 is a plan view of the blank from which is formed the box body.

Figure 15 is a plan view of the blank from which is formed the rear reenforcing and spacing member.

Figure 16 is a view taken similarly to Figure 5, but shows an alternate form of the cover member.

Turning now the first embodiment of the invention illustrated in Figures 1 to 15 inclusive, the display container generally indicated by numeral 20 includes generally a box body 21 and a cover 22. Within the cover 22 a display cell 23 is detachably supported, as will be more fully described herein below. The cover 22 is hingedly connected to the body 21 so that in the lowered position thereof, as seen in Figure 3, the cover acts as a closure for the body while in the upper or elevated position thereof, as seen in Figure 2, the cover with its attached display cell acts as a display surface and means.

The construction of the box body 21 will be more readily understood by a description of the manner in which the same is fabricated. The body blank 24 includes a bottom wall portion 25, a front wall portion 26, a top wall portion 27, a rear wall portion 28, and side wall portions 29 and 30. The control member support plate 31 has the upper surface 32 thereof provided with a depression or groove 33 best seen in Figure 10. The upper surface 32 is secured preferably by means of a suitable adhesive to the under surface 34 of the top wall panel 27. A preformed control member 35 may be placed within the groove 33 prior to the adhering operation just described or the control member may be inserted in the groove 33 after the parts have been fastened together and subsequently bent to shape. The top wall panel 27 is bent upwardly, as seen in Figure 14, along the line 36 and the side wall portions 29 and 30 are bent upwardly along the lines 37 and 38 respectively. The front wall portion 26 is bent upwardly along the line 39 until the edges 40 and 41 meet the edges 42 and 43 respectively. The rear wall portion 28 is bent upwardly along the line 44 until the edges 45 and 46 meet the edges 47 and 48 respectively. The then meeting edges 40—42, 41—43, 45—47, and 46—48 are preferably cemented together in any suitable manner.

Next the rear reenforcing and spacing member 50 is formed by folding downwardly (as viewed in Figure 15) along the lines 51, 52, 53 and 54 and the portions 55 and 56 are cemented together. The rear reenforcing and spacing member will then form an open ended hollow object having the appearance in section as seen in lower right hand portions of Figure 2 and Figure 3. The side reenforcing and spacing members 57 and 58 are substantially identical so that a description of one will suffice for both. The blank from which the member 57 is formed is folded downwardly, as viewed in Figure 12, along the lines 59, 60, 61 and 62 and the portions 63 and 64 are secured together by means of an adhesive so that the members 57 and 58 will appear in section, as seen in Figure 8.

The lid or cover 22 is preferably composed of a single sheet of material having a straight lower edge 60 and a curved top edge 61 and side edges 62 and 63. The central portion of the body of the cover 22 is provided with an irregularly shaped orifice 64 formed by the inner longitudinal edges 65 and 66, and the inner transverse edges 67 and 68. The edge 67 is preferably substantially rectilinear, while the edge 68 is preferably provided with indentations 69 and 70. The general area occupied by the orifice 64 is governed by the size of the cell 23. The cover 22 is hingedly connected to the top surface of the top wall portion 27 so that the cover 22 is adapted for pivotal movement above an axis located substantially along the rear edge of the top wall portion 27. The hinge 71 is preferably composed of a thin sheet of tough flexible paper or of muslin.

The display cell 23 is preferably formed from three pieces of relatively stiff transparent sheet material such as sheet cellulose acetate and includes a body portion 73, a circular end 74, and an elliptical end 75. The body portion 73 is formed from a rectangular piece of sheet transparent material and the two opposite ends of which are cemented by a lap-joint with any suitable transparent adhesive to form a cylinder of uniform diameter. The circular end 74 is provided with a central convex portion 76, best seen in Figures 5 and 7, the convex portion extending outwardly of the cell 23. The central portion of the convex portion is depressed or indented to form a rectilinear groove 77. The configuration of the circular end 74 is such that the outermost portion of the convex portion 76 extends outwardly of the circular edge 78 of the body portion 73. The elliptical end 75 is preferably substantially planar at the center portion thereof.

In assembling the display cell, the body portion 73 may be formed by wrapping a piece of transparent sheet material about an object to be displayed such as an eye-lash curler generally indicated by numeral 80, or the cylinder may be preformed with the circular end 74 integrated therewith. After the curler 80 is in place within the cylinder the remaining open ends of the cell 23 are closed by cementing the remaining ends in place along the edges 78 and/or 79.

The construction of the display cell 23 is therefore such that the entire cell may be detachably engaged within the orifice 64 by a simple snapping operation. The convex portion 76 being made of relatively thin resilient material, will flex sufficiently so that the cell may be simply installed in the following manner: The elliptical end 75 is first inserted within the orifice 64 with the outer surface of said end in contact with the edge 68, the rim or edge 79 extending into the indentations 69 and 70. The other end of the cell, that is, the circular end 74 is then swung radially about the edge 68 into the orifice 64, the convex portion 76 being depressed or flexed by engagement with the edge 67 until said edge snaps into the groove 77. The removal of the display cell requires the foregoing manipulations in exactly reverse order.

In the alternate construction of the cover shown in Figure 16, needless repetition is avoided by the use of the same reference numerals with an added prime designating the corresponding parts. The principal variation in the form shown in Figure 16 lies in the fact that the edge 68' is provided with a central indentation 90', while the edge 67' includes two projections 91' and 92'. In accordance with this construction, the circular end 74' of the cell 23' is planar and the distance between the projecting portions 93' and 94' of the edge 68' on one hand, and the projections 91' and 92' is substantially equal to the distance between the outer surfaces of the circular end 74' and the elliptical end 75'. In inserting the display cell in the cover 22' either end may be inserted first and the remaining end is swung into place by snapping the then free edge of the cell, that is to say, the edge 78', if the end 75' had been first inserted, or the edge 79', if the end 74' had been first inserted. The relatively small size and resilience of the parts permits a snapping action to take place as the cell is inserted or removed.

Assuming the container 20 to be assembled as shown in Figure 3, it will be seen that the display cell 23 completely fills the orifice 64 so that the cover 22 is in fact a complete cover and protection against dust and contamination of the contents of the display container 20. In this view the control member 35 is in the down position thereof so that the cover 22 remains closed by the action of gravity. The display container 20 may then have within it a plurality of auxiliary containers, 82, 83, and 84, which may contain additional objects similar to the one on view within the display cell 23, as for example, additional eyelash curlers such as 80.

The control member 35 includes a central axle portion 85, a stop portion 86 and a cover engaging portion 87. The stop portion 86, as viewed in Figure 4, is disposed in a horizontal plane and at right angles to the axle portion 85. The cover engaging portion 87 is disposed in a vertical plan and at right angles to the axle portion 85. The position of the control member in Figure 3 is illustrated by the dot-dash lines in Figure 4. In order to elevate the cover to its upper or open position for either display or access purposes, it is necessary only to raise the free edge 88 of the cover 22 whereupon the same will pivot about the hinge 71 and after the cover is in the position shown in Figure 2 the cover engaging portion 87 is grasped and rotated to a position corresponding to the full lines in Figure 4 in a direction as indicated by the arrows thereon. The cover engaging portion 87 will then serve as a support for the cover 22, as seen in Figure 2. The stop portion 86 by coacting with the end surface of the top wall portion 27 serves to limit the rotational movement of the control member to a swing of 180 degrees.

Since the display container 20 is especially designed to foster both the display and convenient storage of products for ready sale of merchandise, it is preferable that the same be very attractive in appearance, and to this end the entire container is covered with any desirable covering material 90 of a decorative nature, for example, a printed or lithographed paper, thus providing several display surfaces which may carry either decorative or a sales message. The cover 90 also serves to reenforce the various joints formed in the construction of the container as previously described. Thus the cover 22 may have a display material 91 thereon and on the opposite surface, another display material 92. Thus when the cover is in the upper or open position thereof, the display material 91 is most clearly on view, and this may contain reading matter intended for the customer. The reading matter on the display material 92 may primarily be directed to the sales person which it faces so that both the display material 92 and also display material 93 as well as display materials 94, 95 and 96 may face the sales person as he removes the auxiliary containers 82—84 from the container 20. The display material 96 offers a principal display surface directed to the customer, while additional display material may be placed upon the outer surface of the side wall portions 28 and 29. Certain directions or confidential information may be placed upon the display material 98.

Directions for utilizing the movable brace or control member 35 may be placed upon the surface 99. The decorative material 100 superposing the top wall portion 27 also provides an additional surface upon which advertising or other subject matter may be placed. It may be noted at this point that when the cover 22 is in the closed or lowered position thereof, the display container may be utilized in such a manner that the display cell 23 will face the customer in which event the display cell and cover act of course to conceal and protect the auxiliary containers in storage as well as to conceal from the customers' view the subject matter particularly directed to the attention of the sales person.

We claim:

1. A display container comprising: a box body in the form of a hollow vessel with an opening, said box body having a top panel adjoining said opening; a cover member hingedly connected to said top panel and adapted in a closed position thereof to act as a closure for said opening and in an open position thereof to act as a display; and means to support the cover member in the open position thereof comprising a rotatable control member journalled on the top panel, said control member including a central axle portion and a cover engaging portion extending radially off one end of said axle portion.

2. A display container comprising: a box body in the form of a hollow vessel with an opening, said box body having a top panel adjoining said opening; a cover member arcuately movable with relation to said top panel and adapted in closed position thereof to act as a closure for said opening and in an open position thereof to act as a display; and a rotatable control member including an axle portion, a cover engaging portion extending radially off one end of the axle portion, and a stop portion radially extending off the other end of the axle portion, said stop portion being rotated through substantially 90 degrees with relation to said cover engaging portion, said axle portion being journalled on said top panel.

3. A display container comprising: a box body in the form of a hollow vessel with an opening, said box body having a top panel adjoining said opening; a cover member hingedly connected to said body, adapted in the closed position thereof to act as a closure for the said box body and in the open position thereof to act as a display, said cover member being provided with an orifice; and a cell adapted to contain an article, said cell having an end with a central convex outwardly extending portion provided with a groove, said cell being detachably engaged within said orifice by the groove engaging an edge of said orifice.

4. A display container comprising: a box body in the form of a hollow vessel with an opening therein, said box body having a top panel adjoining said opening; a cover member hingedly connected to said top panel and adapted in a closed position thereof to act as a closure for said body and in the open position thereof to act as a display, said cover member being provided with an orifice; and a transparent cell adapted to contain an article, at least one end of said cell having a convex portion provided with a groove adapted to detachably engage an edge of said orifice; the transparent cell showing an article contained therein, and when the cover member is in the closed position thereof showing the contents of the box body.

5. A display container comprising: a box body in the form of a hollow vessel having an opening and adapted to contain articles of merchandise; a cover member pivotally connected to said body, adapted in the closed position thereof to act as a closure for said box body and in the open position thereof to act as a display, said cover member being provided with an orifice and a transparent cell adapted to contain an article, said cell being detachably engaged within said orifice and displaying its enclosed article when viewed from either side of said cover member, said cell showing the contents of the container when the cover member is in the closed position thereof.

WILLIAM R. TUTTLE.
CHARLES W. STICKEL.